July 16, 1940.
W. A. BRECHT
2,208,408
FABRICATION OF ELECTRIC MOTOR FRAMES
Filed May 26, 1938
3 Sheets-Sheet 1
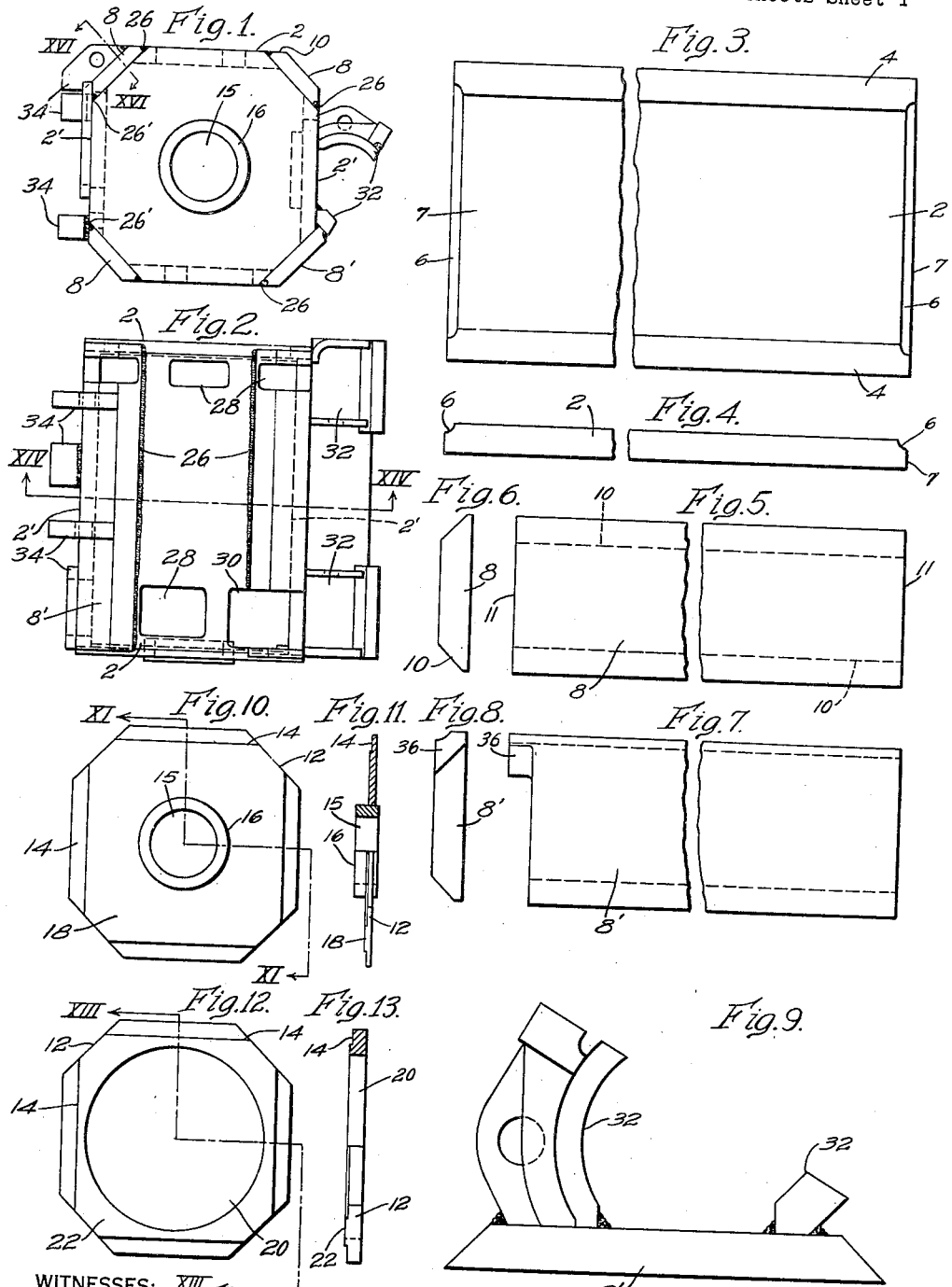
INVENTOR
Winston A. Brecht.
BY O.B.Buchanan
ATTORNEY

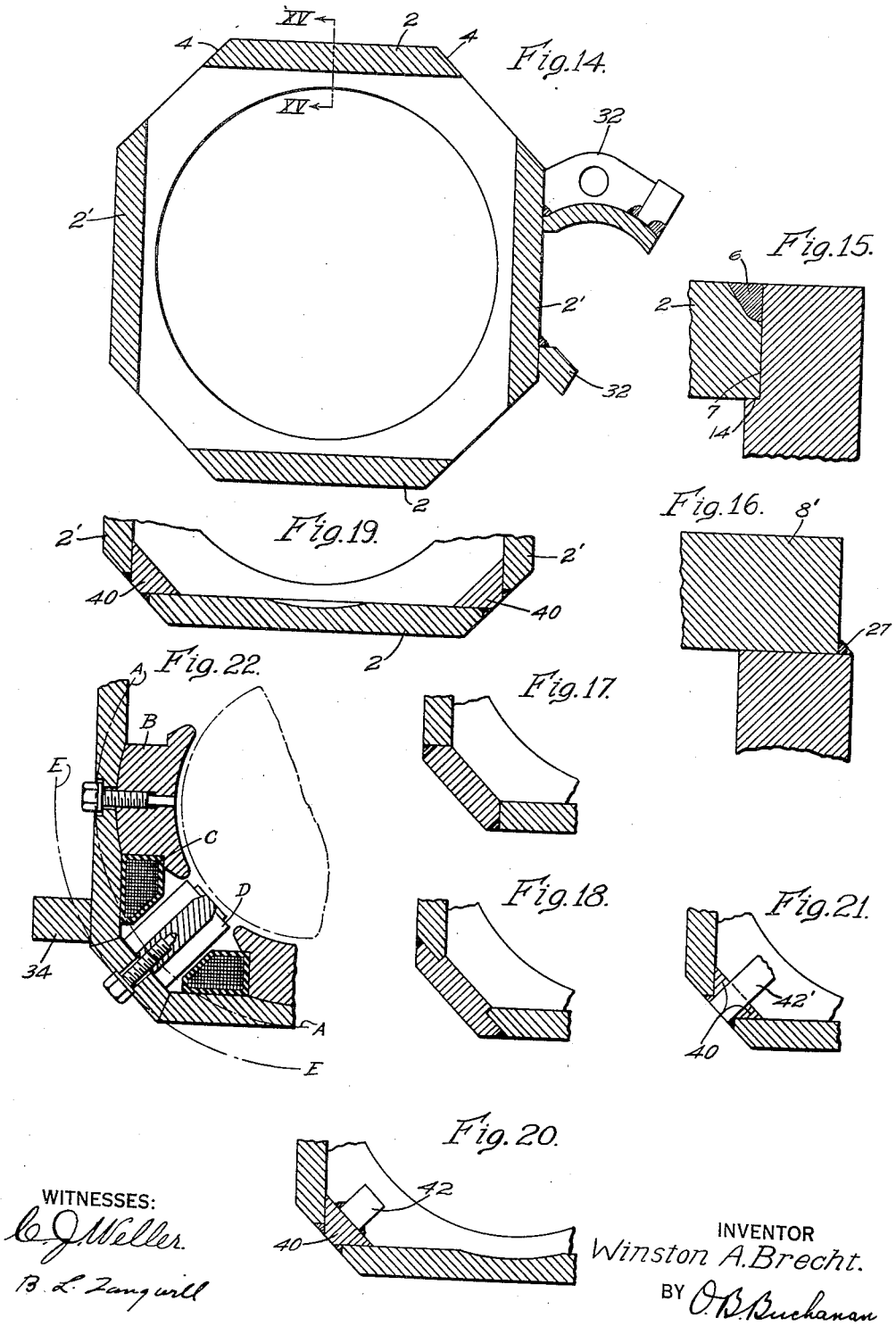

July 16, 1940.                      W. A. BRECHT                      2,208,408
                        FABRICATION OF ELECTRIC MOTOR FRAMES
                            Filed May 26, 1938           3 Sheets-Sheet 3
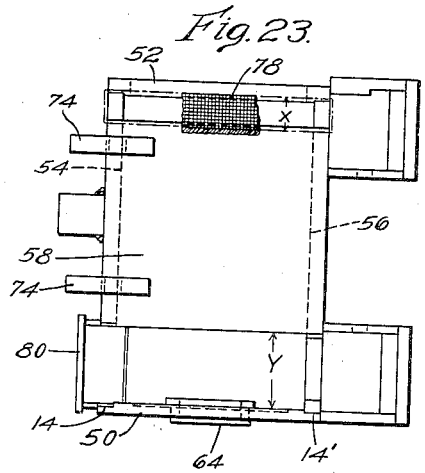
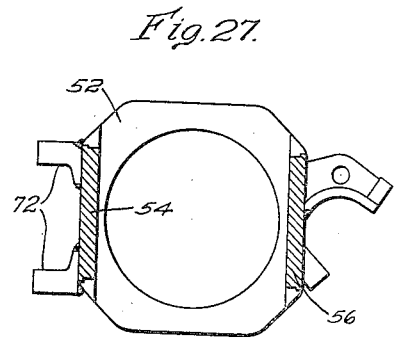
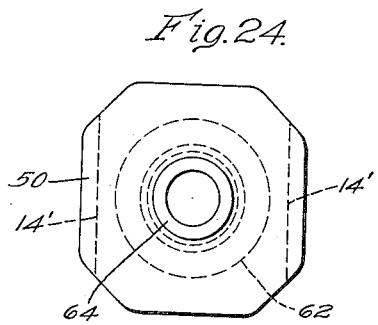
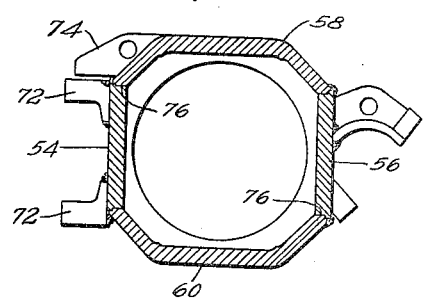
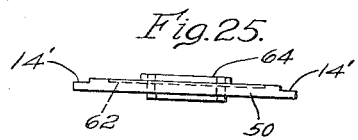
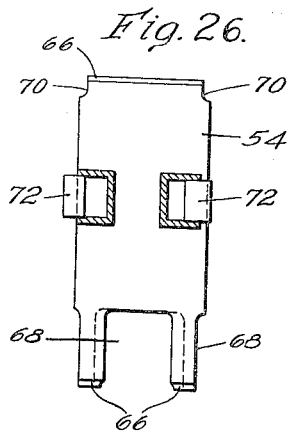
WITNESSES:
C. J. Weller
B. L. Zangwill
INVENTOR
Winston A. Brecht.
BY O. B. Buchanan
ATTORNEY Patented July 16, 1940

2,208,408

UNITED STATES PATENT OFFICE 2,208,408

FABRICATION OF ELECTRIC MOTOR FRAMES

Winston A. Brecht, Forest Hills, Pa., assignor to Westinghouse Electric & Manufacturing Company, East Pittsburgh, Pa., a corporation of Pennsylvania Application May 26, 1938, Serial No. 210,186

15 Claims. (Cl. 171—252)

My invention relates to a new manner for obtaining motor frames in that I fabricate the same from standard stock steel parts.

The common method of obtaining motor frames is by casting in their entirety. However, the casting of motor frames is attendant with a high unit cost per frame, particularly when only a few frames of a specific design are desired. In the casting of frames heretofore, the patterns and molds are usually complex and in themselves expensive, and where one or at most a few motor frames of a particular design are required, the cost of the patterns may be prohibitive. In addition, complex cast fames frequently have blowholes which adversely affect the magnetic path of the frame, entailing recasting or expensive repairs. Again, in complex cast frames cracks may develop during the machining process, or even in the assembly process of the motor, necessitating delay for repairs and possibly complete discarding of the frame.

It is, therefore, an object of my invention to provide a more economical method of producing motor frames.

It is a further object of my invention to provide motor frames which can be built by the use of simple standard plates of steel or cast subassemblies of simple design. The plates are preferably of rolled steel which inherently has uniform density and uniform magnetic properties, and the parts to be cast are of simple design, involving cheap patterns and no difficult foundry problems.

It is still another object of my invention to povide motor frames which can be built with great flexibility of design without entailing large manufacturing costs. I do this by fabricating parts for the frame from sheet steel or rolled plates, and thereby eliminate the necessity for casting of complex portions. Moreover, my invention enables a greater selection of different types of steel which can be chosen to give desired characteristics relating to permeability and the like.

It is a further purpose of this invention to achieve a fabricated frame which will result in an accurately fashioned frame, one of great strength and which will require a minimum of machining operation, much of which may be done on the elements comprising the frame prior to assembly of the entire frame structure.

Further novel features of my invention will be apparent from the following description in which I show my invention applied to direct current railway motor frames for axle hung motors. I do not, however, desire to be limited to this particular type of motor, but I have chosen this motor solely as the vehicle by which to describe one specific embodiment of my invention, as required by the patent statutes.

Referring to the drawings which are on varying scales:

Figure 1 is an end view looking at the commutator end of an axle hung direct current railway motor, Fig. 2 is a view looking at the top thereof, Figs. 3 and 4 are top plan and side elevational views, respectively, of a side plate of the frame before assembly, Figs. 5 and 6 are top plan and end elevational views of a corner plate thereof, Figs. 7 and 8 are similar views of a special corner plate, Fig. 9 is an end elevational view of a special side plate assembly having thereon the wheel axle bearing support, Fig. 10 is a view of the commutator end plate with a rotor bearing mounted therein, Fig. 11 is a sectional view on the line XI—XI of Fig. 10, Fig. 12 is a view showing the pinion end plate, Fig. 13 is a sectional view on the line XIII—XIII of Fig. 12, Fig. 14 is a sectional view on the line XIV—XIV of Fig. 2 on an enlarged scale except that no corner plates and motor supporting noses are shown. This figure shows the frame at one stage of its fabrication, Fig. 15 is a sectional view on the line XV—XV of Fig. 14 and shows one manner of fitting and welding the side plates to the end plates, Fig. 16 is a sectional view on the line XVI—XVI of Fig. 1 on an enlarged scale and indicates one manner of welding the corner plates to the end plates, Figs. 17, 18, 19, 20 and 21 are fragmentary views in section on an enlarged scale of modifications of corner plates that may be employed in my frame, Fig. 22 is a broken away sectional view of a motor including my frame, Fig. 23 is a plan view of another motor frame embodying the principles of my invention, Figs. 24 and 25 are side and end views respectively of the commutator end plate thereof, Fig. 26 is an elevational view of a side plate at one stage of the fabrication of the motor frame, Fig. 27 is a sectional view through the motor frame in a stage in its fabrication, and Fig. 28 is a sectional view through the motor frame at a later stage in its fabrication.

Axle hung direct current railway motors are generally of octagonal cross section with alternate sides of the octagon of greater length than the corner sides thereof. Such design is made necessary by the fact that the cubic content of the motor must be kept within certain specified space factors, usually determined from the car truck upon which the motor will be mounted. The reason for such an octagonal shape may be best understood by a reference to Fig. 22, where the arc AA indicates the outside dimension of a motor of circular cross section. It may be assumed that the main pole piece B for the octagonal motor or the circular motor will be of the same design since this is a factor of the required flux. It will be observed, therefore, that in a circular motor along the arc AA, space is not completely available for the main field coil winding C or for a satisfactory interpole D. If the circumference were extended to the arc EE, sufficient space would be available for the commutating interpole D. However, more than sufficient space is available for the main pole and its winding. Accordingly, by making the frame octagonal, the superfluous space is made available for other purposes with no sacrifice of desirable operating characteristics of the motor.

To my knowledge, however, such octagonal frames have heretofore been cast either in their entirety or in two half sections, with the resultant disadvantages aforementioned.

I, therefore, fabricate my frame mostly with parts from plate steel stock obtained preferably by rolling. The frame comprises a number of plates of simple form which are first manufactured to the desired dimensions, contours and angles, after which the various assembling steps are undertaken.

Referring to the drawings, it may be observed that an octagonal motor of the type disclosed requires four side plates 2 and 2', four corner plates 8 and 8' and two end plates, one of the last of which may be designated as the commutator end plate 18 and the other as the pinion end plate 22.

The side plates 2 and 2' have the general form shown in Figs. 3 and 4 and comprise nothing more than rectangular plate stock. For the fabrication for this particular motor, I have shown side plate 2 with beveled edges 4 on opposite sides along the length of the plate, the purpose of which will later become apparent. Welding grooves 6 are on the ends 7 of the side plates which are to be adjacent the end plates. These end edges 7 are substantially square except for the weld preparation groove.

For the particular modification now being described, the corner plates also comprise nothing more than rectangular plates having along the length thereof beveled faces 10 and square edges 11 along the width.

In the same manner, each of the end plates comprises originally a rectangular steel plate. For the particular motor shown, I first burn out the corners for the corner sides 12, although any other method of obtaining the narrow sides for the octagon on the end plates may be utilized. An opening 15 for a rotor bearing housing 16 on the commutator end plate 18, and an opening 20 in the pinion end plate 22 through which the rotor may be inserted, may then be formed. I prefer to first burn out the openings to rough dimensions, and then complete the bores by machining to accurate tolerances. The long sides 14 are machined accurately from the bores to provide joints which will receive the side plates, and automatically position the inside face of the side plates with respect to the center of the bores. This makes unnecessary any further machining on the insides of the frame for the positioning of electrical field elements of the motor.

To assemble a simple motor frame, the side plates 2 and 2' may be fitted with their squared edges 7 in the machined joints 14 of the commutator and pinion end plates and welded along the top thereof, as shown at 6 in Fig. 15. This weld is a rather heavy weld in order that a fairly substantial and rigid structure is created at this stage. I prefer to use a mandrel or jig to hold the elements in place during this assembly.

It is evident thus far that a rather cage-like structure is obtained with the end plates forming the top and bottom bases and the side plates welded thereto. The side plates are positioned in the joints 14 with their beveled faces 4 lying along the corner lines of the octagon. To complete the frame, these edges may be machined to proper size and direction, if necessary, and the corner plates 8 and 8' laid flat thereupon, as shown in Fig. 1. The corner plates and side plates are welded along their adjacent edges as shown at 26 (Figs. 1 and 2). This weld need be only a light weld for the time being. If desired, the corner plates may be additionally lightly welded to the end plates as shown at 27, Fig. 16.

I prefer to anneal the cage structure consisting of the end plates and side plates prior to welding the corner plates thereupon. I do this because I have used a heavy weld between the side plates and end plates which may possibly cause some distortion or internal stresses in the structure. Thereafter, only light welds are used so that annealing of the entire completed frame is not so essential.

Any openings that are necessary to the motor frame, such as ventilating openings 28 or cover plate openings 30, may now be burned out of the frame although any other method of obtaining such openings is within the contemplation of my invention. The openings 30 are provided for ready access to the commutating parts of the motors and are usually closed by a properly designed lid.

It will be observed that the motor shown in Fig. 1 has additional parts attached to the sides 2'. The railway motor of the type I am describing requires an axle bearing support, generally indicated at 32 and motor supporting noses or lugs indicated in their entirety by the numerals 34, this particular motor being supported by these elements. These elements may, of course, all be welded to a completed frame, but I prefer to weld these elements, whenever possible, to separate side plates or corner plates, as the case may be, to facilitate the ease of manufacture and to permit, if necessary, straightening of plates 2' after welding parts 32 or 34 to them but before welding into the frame.

As shown in Fig. 9, a side plate 2' has the axle bearing supports 32 welded thereto. This is done prior to the welding of the said side to the end plates. The lower corner plate 8' may be formed as shown in Figs. 7 and 8, with a protruding portion 36 to fit a part of the axle bearing support 32 when the plates are assembled into a frame. In the particular motor which I describe, the motor supporting noses 34 lie opposite the welds 26' between the corner and side plates. For this reason, I prefer to weld the motor supporting noses to the assembled frame. However, if the motor suspension noses are required to be positioned on the side plate below the welds 26', it may be desirable to weld such noses to the side plate before the latter is welded as a part of the cage frame previously described. The axle side plate sub-assembly and the suspension side plate sub-assembly may, however, be cast and these castings fabricated into the complete frame just as though the sub-assemblies were themselves fabricated. Whether the sub-assemblies are fabricated or cast will depend on the number of frames desired, the complexity or simplicity of the design, and available facilities.

It should be observed that in the frame I have assembled, there are no welds which pull against each other and there is little distortion. The frame is now ready for machining. The machining operations have been reduced to a minimum consisting only of: (a) planing or milling the reference line for the wheel axle bearings, (b) boring the main pole seats, housing seats, and axle bearing seats and (c) drilling and tapping for the necessary bolts. In my new frame no machining of field coil seats is required as in cast frames because of the automatic alignment of the inner surfaces of the side members. Ordinarily on cast frames this machining is a costly draw shaping operation, but this is eliminated in my frame.

To summarize the operations which I prefer to follow for obtaining a complete motor frame, the first step is the necessary burning and machining of the rectangular side, corner, and end plates. Any other parts which may be required for a particular motor may be welded or otherwise fastened to the individual plates unless sub-assemblies can be more cheaply or more readily cast and substituted. In this specific instance, I have shown a car axle bearing support welded to the plate 2', although it is obvious that any other structure may be similarly applied to any other desired plates before their assembly, or in simple designs the sub-assemblies may be cast. The cage frame is then obtained by welding the side plates to the end plates. As this stage, I prefer to anneal the cage frame, although such annealing process may be omitted where conditions permit. The corner plates are then welded to the cage frame to complete the structure.

Any holes in the frame which extend beyond more than one unit plate may be burned out or otherwise obtained after the frame has been assembled or may be obtained by operations on the individual sub-assemblies and, if desired, openings which occur in any of the unit plates may be burned out prior to their assembly into a frame. It is obvious, therefore, that the particular point at which the burning out step is inserted for the holes is a matter of choice and will depend largely upon the type of frame being fabricated and the manufacturing facilities available. In some types, it may even be desirable to burn out all openings simultaneously.

The frame now requires only light machining to adapt it for accurate positioning of the electrical parts constituting the motor or their supports.

In Figs. 17 through 21, I show modifications by which the corner plates and side plates may be mated.

In Fig. 17, the side plates have no beveled faces similar to that of the beveled face 4. The edge is formed square and the edge of the corner plate machined to mate therein properly with allowance for welding to the side plates.

In Fig. 18 the edges of the corner and side plates are mated to obtain a more secure interlock.

Fig. 19 shows a somewhat different form of assembly. The side plates are somewhat wider than those of the modification described in detail and the corner plates are triangular in cross section as shown at 40. In this case, triangular rods may be utilized that fit snugly in the corners of the rectangle along which the insides of the side plates lie. It will be observed that this construction results in an octagon frame of the same dimensions as shown in the modification described in detail.

Figs. 20 and 21 show further modifications along the lines of the modification shown in Fig. 19 but in which commutating pole stubs 42 and 42' are shown preassembled to triangular rods.

The modifications described heretofore all employed individual substantially rectangular plates for each of the sides on the polygon of the motor frame. However, any two or more sides may obviously be made of unitary stock, bent or formed to the proper angles and in the modifications of Figs. 23 through 28, I show still another motor frame in the fabrication of which this aspect of my invention is employed.

Fig. 23 shows the frame in its somewhat completed stage. This frame comprises a commutator end plate 50 and a pinion end plate 52. These end plates have but two machine joints 14' equivalent to the joint 14 of the previous modifications and at opposite sides of the polygon. Mated in these joints are the side plates 54 and 56. Top and bottom members 58 and 60 complete the major structure of the frame.

The commutator end plate is shown more particularly in Figs. 24 and 25 and except for the fact that it has but two machined joints 14', it is similar to the commutator end plate shown in Fig. 10. However, in the embodiment now being described I machine finish an angular groove 62 in this end plate 50. The bore in this commutator end plate is accurately machined so that a bearing hub 64 when mounted therein, will be accurately aligned. Moreover, the joint surfaces 14' and the groove 62 are machined with a degree of accuracy so that these machined surfaces along the body of the end plate are perpendicular to the aforesaid bore. In this way a brush-holder yoke (not shown) which has previously been accurately fastened with an angular ring base may be mounted in the groove 62 and will automatically be properly aligned for contact with the commutator of the rotor, and the inner surfaces of the side members fitting the joint surfaces 14' will be correctly spaced from the axis of the motor frame.

The pinion end plate 52 is very much the same in form as the pinion plate shown in Fig. 12 but here again only two machined joint surfaces such as 14 of Fig. 12 are necessary in the embodiment now being described.

The side plates which fit into the machined joint surfaces of the end plates are identical except for the openings in them that may be fashioned by burning and the different appurtenances such as suspension or support rods that may be secured to or be unitary with them. One such side plate is shown in Fig. 26 and has grooves 66 for welding purposes. The particular side plate 54 shown in Fig. 26 has openings 68 and 70 fashioned therein and motor suspension lugs 72 welded thereon before the plate is assembled as part of the motor frame. The side plate 56 is similar to the side plate 54, as aforementioned. It is also provided with grooves for welding to the end plates and in the formation of the side plates, I prefer to burn out such openings as are necessary in each of them and then weld on to them such lugs or other members as may be deemed necessary. At this stage it may be found advisable to straighten the side members, particularly if heavy welds must be employed between the side members and the lugs or the like. In order to secure accurate fabrication of the motor frame, I then machine the ends of both side plates simultaneously to insure equal lengths between them. I may state that in this embodiment also the sub-assemblies just described can be cast as in the prior modifications and for the same reasons.

The end plates and side plates are then assembled, preferably in a jig, for welding into a cage-like structure comprising the two end plates and the two opposite side plates, a section of which structure is shown in Fig. 27. In the meantime the top and bottom side members 58 and 60 may have been fashioned for assembly into the cage frame. Each member 58 and 60 comprises a channel-like member embracing three sides of the octagon frame shown. In my preferred method of manufacture, I prefer to have each of these side members originally plate stock, which is then bent by any appropriate process to the form shown in Fig. 28. Additional lugs such as 74 may be welded on either or both of the side members, a lug 74 being shown on the side member 58 in this particular embodiment. These side members may be strain relieved, if necessary, and then machined accurately to fit into the cage frame. As shown in Fig. 28, stepped mating surfaces are machined on the longitudinal edges of the side plate 54 and 56 and the side members 58 and 60. These mating surfaces form the joints generally indicated by 76.

When the side members 58 and 60 are ready for fastening to the cage frame of Fig. 27, the joints 76 are mated and the side members positioned accurately with relation to the end plates.

As shown in Fig. 23, the side members are of a length only sufficient to provide the necessary magnetic sections and are positioned a distance X from the pinion end plate and a distance Y from the commutator end plate. By this construction, I minimize the amount of metal required for the frame and I automatically provide openings for ventilation and for access to the commutating parts. The openings for ventilation are shown in Fig. 23 as covered by a mesh screen 78. The space Y corresponds in length substantially to the length of the openings 68, and these openings are utilized for an air inlet and for commutator access. An air inlet structure such as 80 is shown in Fig. 23 on the complete frame, and commutator end cover supports (not shown) may be suitably mounted on the remaining openings at this end. Supporting frame pieces (not shown) may be welded or otherwise secured to the motor frame and may extend partially into the openings to provide a support for the commutator and covers.

A fabricated frame construction along the lines hereinbefore described has many marked advantages over present cast frames. By the substitution of rolled steel, the possibility of blow holes with their ill effect on the magnetic circuit and the mechanical strength of the frame is eliminated. By welding the mating surfaces of the side elements a satisfactory magnetic path is provided in spite of the fact that the frame is fabricated. The cost of the plate steel plus the cost of fabrication is materially less than that of the cost of a rough cast frame, particularly where only a few frames are desired. The heavy pattern expense to produce a new cast frame is eliminated and no heavy machining, such as is frequently required on cast frames, is necessary on the fabricated frame. The amount of metal which must be removed by machining of the fabricating frame is manifestly only a small fraction of that which must be removed from a cast frame.

My manner of fabricating polygonal motor frames has many other advantages over prior methods for obtaining such frames. All the parts are small and simple compared to the complete frame itself. In instances such as in the last described embodiment of the motor frame, the side plates may be chosen of such dimension as to automatically provide the openings which most motors require for access to the commutator or for ventilation.

While I have illustrated my invention in forms which I now believe to be the best modes of application thereof, it is obvious that many changes may be made within the spirit and scope of the novel invention which I have introduced. It is desired, therefore, that the appended claims be given the broadest construction limited only by the prior art, and the term "electric motor" be construed to include electric dynamo machines broadly whether they be motors or generators.

I claim as my invention:

1. An electric motor comprising a fabricated octagonal frame having wide sides alternating with narrow sides, and comprising end plates having joint surfaces along said wide sides, individual flat side plates fastened to said end plates and joining the end plates at said surfaces, the said side plates having their edges formed along said narrow sides, additional flat side plates abutting said edges, and weld joints between the last said side plates and said edges whereby said octagon is completed, certain of said plates having openings for ventilation and for access to a commutator.

2. A motor of generally regular octagonal cross section having wide sides alternating with narrow sides, comprising a fabricated frame comprising end members having fit surfaces along a pair of opposite of said wider sides, individual wide flat side plates fitting the end plates at said surfaces, main pole pieces fastened to said side plates, additional side members comprising said narrow sides and the remaining wide sides, and commutating pole pieces fastened to the last said narrow sides, said members and plates being fastened into a rigid unitary structure.

3. The structure defined in claim 2 wherein one of said end members is a plate having a hole therein sufficiently large to pass a rotor of the motor therethrough, and the other end member is a plate having a rotor bearing hub centrally thereof.

4. A motor of generally regular octagonal cross section having wide sides alternating with narrow sides, comprising a fabricated welded frame comprising end plated having fit surfaces along said wide sides, individual wide flat side plates fitting the end plates at said surfaces, main pole pieces fastened to said side plates, additional narrow side members comprising said narrow sides, commutating pole pieces fastened to the last said sides, one of said end plates having a rotor bearing hub and the other a central bore sufficiently large to pass a rotor through.

5. A fabricated octagonal motor frame comprising an octagonal commutator end plate and a back end plate, each plate having an aperture with that in the back end plate the larger, a rotor bearing hub in the aperture of the commutator end plate, the inside surface of said commutator end plate having portions machined perpendicular to the bore of said hub whereby a brushholder may be mounted thereon and automatically aligned, channel-like members each constituting substantially three sides of said octagon, and intermediate members, said channel-like members alternating with said intermediate members to complete the frame, said end plates and members being welded together into a rigid structure.

6. An electric motor having a central, longitudinal axis and comprising a fabricated frame having end members, said end members being centrally bored for the reception of a rotor, each of said end plates having two opposite and parallel sides formed with joint portions, each one of said joint portions on one of said end members associated with a separate one of said joint portions in the other of said end members, planar frame-side members extending between the said associated joint portions, interfitting therewith, and secured to said end members, and additional frame-side members for completing the frame welded to the axial edges of the first said frame-members, the last said members being axially shorter than the first said members.

7. An electric motor having an axis and comprising a fabricated frame having end plates of octagonal contour, said end members being centrally bored for the reception of a rotor, each of said end plates being formed with shoulders at alternate sides thereof; substantially planar frame-side members between said end plates and fitting opposed shoulders, one on each of said plates, and welded to said plates; and additional frame-side members welded to said end plates and the first said frame-side members.

8. A fabricated octagonal motor frame comprising an octagonal commutator end plate and a back end plate, each plate having a hole with that in the back end plate the larger, a rotor bearing hub in the hole of the commutator end plate, the inside surface of said commutator end plate having portions machined perpendicular to the bore of said hub whereby a brushholder may be mounted thereon and automatically aligned, and substantially planar frame-side members extending between said end plates and welded thereto, and additional frame-side members welded to the first said members to complete the frame.

9. The structure of claim 8 in which certain of said frame-side members have apertures for ventilation and access to the commutator.

10. An octagonal railway motor for driving car axles, said motor comprising a frame with end members having an octagonal contour, and having facing joint surfaces on certain edges thereof, a pair of opposite sub-assemblies mating said joint surfaces and forming with said end members a cage-like structure, one of said sub-assemblies having a wheel axle bearing housing integral therewith, and the other motor suspension means integral therewith, and a plurality of additional plate members completing the sides of frames between said sub-assemblies, and weld joints integrally securing the side edges of said plate members and the said sub-assemblies into a rigid structure.

11. The structure of claim 10 wherein sub-assemblies are formed with apertures for access to the commutator of the motor.

12. A fabricated motor frame of octagonal section having a longitudinal axis and comprising an octagonal commutator end plate and a back end plate substantially perpendicular to said axis, each plate having a hole with that in the back end plate the larger, a rotor bearing hub in the hole of the commutator end plate, a pair of opposite frame-side members extending between said end plates and welded thereto, the edges of said members being formed with surfaces as part of a joint, and channel-like members each constituting substantially three sides of the said octagon and having edges formed with surfaces mating the first said surfaces, said end plates and members being welded together into a rigid structure.

13. The structure of claim 12 in which said channel members are shorter than said intermediate members and spaced from both said end plates.

14. In a motor of generally octagonal cross-section having wide sides alternating with narrow sides, a fabricated welded frame comprising end plates having fit surfaces along said wide sides, individual flat wide-side plates for said wide sides fitting the end plates at said surfaces, main pole pieces fastened to said wide-side plates, triangular bars forming in conjunction with said wide-side plates the said narrow sides of the frame, said bars having two adjacent sides each abutting part of the adjacent surfaces of said side plates.

15. The method of fabricating a polygonal motor frame from end plates having contours corresponding to said polygonal form and frame-side members including a pair of substantially planar plates of substantially equal size, which consists of boring said two end plates and machining two opposite edges each accurately with respect to the centers of said bores, mating each of said pair of frame-side members to one of said edges on each of said end plates and securing the resulting structure, and then mating and securing additional frame-side members to and intermediate the first said frame-side members.

WINSTON A. BRECHT.